United States Patent
Tanonaka et al.

(10) Patent No.: US 8,326,147 B2
(45) Date of Patent: Dec. 4, 2012

(54) TRANSMISSION APPARATUS, TRANSMISSION CONTROLLING METHOD, AND OPTICAL SUPERVISORY CHANNEL (OSC) PROCESSING APPARATUS

(75) Inventors: Koji Tanonaka, Kanagawa (JP); Kenji Watanabe, Kanagawa (JP); Tomoyuki Suzuki, Kanagawa (JP); Akihisa Kawaguchi, Kanagawa (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 442 days.

(21) Appl. No.: 12/724,398

(22) Filed: Mar. 15, 2010

(65) Prior Publication Data

US 2011/0008049 A1    Jan. 13, 2011

(30) Foreign Application Priority Data

Jul. 9, 2009   (JP) .................................. 2009-162905

(51) Int. Cl.
*H04B 10/00*    (2006.01)
(52) U.S. Cl. ................. 398/47; 398/46; 398/50; 398/56
(58) Field of Classification Search ............... 398/45–57
See application file for complete search history.

(56) References Cited

U.S. PATENT DOCUMENTS

| | | | | |
|---|---|---|---|---|
| 5,311,501 A | * | 5/1994 | Takatsu | 370/357 |
| 5,315,594 A | * | 5/1994 | Noser | 370/353 |
| 5,341,364 A | * | 8/1994 | Marra et al. | 370/223 |
| 5,416,772 A | * | 5/1995 | Helton et al. | 370/376 |
| 5,440,540 A | * | 8/1995 | Kremer | 370/223 |
| 5,555,477 A | * | 9/1996 | Tomooka et al. | 398/164 |
| 5,745,269 A | * | 4/1998 | Chawki et al. | 398/59 |
| 5,896,378 A | * | 4/1999 | Barker | 370/384 |
| 5,905,585 A | * | 5/1999 | Shirai | 398/20 |
| 6,246,667 B1 | * | 6/2001 | Ballintine et al. | 370/224 |
| 6,256,291 B1 | * | 7/2001 | Araki | 370/216 |
| 6,298,038 B1 | * | 10/2001 | Martin et al. | 370/216 |
| 6,356,368 B1 | * | 3/2002 | Arao | 398/79 |
| 6,532,320 B1 | * | 3/2003 | Kikuchi et al. | 385/24 |
| 6,850,660 B2 | * | 2/2005 | Notani | 385/16 |
| 7,269,130 B2 | * | 9/2007 | Pitio | 370/217 |
| 7,301,953 B1 | * | 11/2007 | Norman | 370/401 |
| 8,095,004 B2 | * | 1/2012 | Mizutani et al. | 398/25 |
| 2003/0025965 A1 | * | 2/2003 | Takatsu et al. | 359/124 |
| 2009/0245790 A1 | * | 10/2009 | Mizutani et al. | 398/43 |

FOREIGN PATENT DOCUMENTS

| | | |
|---|---|---|
| JP | 11-234323 | 8/1999 |
| JP | 2006-352919 | 12/2006 |
| JP | 2008-177941 | 7/2008 |

OTHER PUBLICATIONS

Japanese-language Office Action dated Jul. 5, 2011 for the related Japanese Patent Application No. 2009-162905 with its English-language translation.

* cited by examiner

*Primary Examiner* — Agustin Bello
(74) *Attorney, Agent, or Firm* — Ladas & Parry, LLP

(57) ABSTRACT

An integrated transmission apparatus includes a plurality of optical supervisory channel (OSC) processing units for processing OSC signals contained in a wavelength division multiplexing (WDM) signal received from a WDM network and a switching unit for performing the path control of synchronous digital hierarchy (SDH) frames. An OSC processing unit transmits the SDH frame, containing wavelength information indicated by, to the switching unit. Another OSC processing unit acquires the SDH frame, containing wavelength information, from the switching unit and sets an OSC signal which is to be appended to the WDM signal to be transmitted, based on the wavelength information.

10 Claims, 11 Drawing Sheets

CONVENTIONAL TRANSMISSION SYSTEM

TRANSMISSION SYSTEM 100

TRANSMISSION APPARATUS, TRANSMISSION CONTROLLING METHOD, AND OPTICAL SUPERVISORY CHANNEL (OSC) PROCESSING APPARATUS

CROSS-REFERENCE TO RELATED APPLICATIONS

This application claims priority to Japan Application No. 2009-162905 filed on Jul. 9, 2009, the disclosure of which is incorporated herein by reference.

BACKGROUND OF THE INVENTION

1. Field of the Invention

The present invention relates to a data communication technology and, in particular, to a transmission apparatus, a transmission controlling method and an optical supervisory channel (OSC) processing apparatus in an optical communication network.

2. Description of the Related Art

Recently, packaging density of optical transmission apparatuses is increasing rapidly. Also, available is a multi-service provisioning platform (MSPP) apparatus that combines and integrates a synchronous optical network/synchronous digital hierarchy (SONET/SDH) apparatus with a switching device (See Reference (1) in the following Related Art List, for instance).

In recent years, available is a wavelength division multiplexing (WDM) transmission apparatus whereby a plurality of optical signals of SONET/SDH networks are multiplexed using WDM technology (See Reference (2) in the Related Art List, for instance).

RELATED ART LIST (1) Japanese Patent Application Publication No. 2008-177941.
(2) Japanese Patent Application Publication No. 2006-352919.

In light of further progress in the high packaging density of optical transmission apparatuses, the inventors of the present invention anticipate that a transmission apparatus providing both the function of the MSPP apparatus and the function of the WDM apparatus in a unified manner will prevail. The inventors of the present invention have come to recognize that achieving a flexible packaging of such a transmission apparatus improves users' convenience significantly.

SUMMARY OP THE INVENTION

The present invention has been made based on the aforementioned novel idea of the inventors, and a main purpose thereof is to provide a technology by which to assure the flexibility in the packaging of a transmission apparatus providing both the function of the MSPP apparatus and the function of the WDM apparatus in a unified manner.

In order to resolve the above-described problems, a transmission apparatus according to one embodiment of the present invention comprises: a plurality of synchronous digital hierarchy (SDH) transmitting units configured to transmit and receive a predetermined SDH frame to and from each other; a switching unit configured to transfer the SDH frame transmitted from an SDH transmitting unit to another SDH transmitting unit; a WDM receiver configured to receive an optical signal from a wavelength division multiplexing (WDM) network; a receive-side optical supervisory channel (OSC) processing unit configured to process an OSC signal appended to the received optical signal; a WDM transmitter configured to transmit the optical signal to the WDM network; and a transmit-side OSC processing unit configured to set an OSC signal which is to be appended to an optical signal to be transmitted. The receive-side OSC processing unit transmits the SDH frame containing wavelength information indicated by the OSC signal, to the switching unit, and the transmit-side OSC processing unit receives the SDH frame containing wavelength information, from the switching unit and sets the OSC signal based on the wavelength information.

The "SDH frame" may be a data frame defined by the SONET/SDH transmission scheme and may be a signal conforming to an STM-n (synchronous transport module-n) format. For example, the optical signal in the STM-1 format may be an electric signal. An interface used to communicate with a device, which can be packaged into a housing of the transmission apparatus using the SDH frames, may be set beforehand in the "switching unit".

By employing this embodiment, the wavelength information is transmitted and received between the receive-side OSC processing unit and the transmit-side OSC processing unit via the switching unit. As a result, unlike the case where the receive-side OSC processing unit and the transmit-side OSC processing unit are connected using a dedicated line, the packaging positions of the E-OSC processing unit and the W-OSC processing unit in the transmission apparatus can be flexibly determined. In other words, when a WDM communication function is to be newly added in the transmission apparatus, a device for processing the OSC signals may be installed in any slots which are unused but available at that time. Also, the packaging positions of the E-OSC processing unit and the W-OSC processing unit which have already been packaged once may be changed easily.

The WDM transmitter and the WDM receiver may transmit and receive the OSC signal in an SDH frame format, respectively, and the transmission apparatus may provide a service provided in an SDH transmission scheme over the WDM network, based on an overhead byte set in the OSC signal received from the WDM network.

The "overhead byte" may be information of session overhead defined by an STM-n. Also, it may be information of path overhead in a VC-n (virtual container-n) frame that constitutes a payload of the STM-n. The "service provided in an SDH transmission scheme" may be a service provided using a predetermined item of path overhead such as a path trace (J1 byte), a path error monitoring function (B3 byte) or a path user channel (F2 byte). Also, it may be a service provided using a predetermined item of section overhead such as an error monitoring function in a relay section (B1 byte), an error monitoring function in a terminal section (B2 bye) or a synchronization status message (S1 byte).

According to this embodiment, the content of OSC signal is transmitted and received in the SDH frame within each transmission apparatus as well as over the WDM network. As a result, the overhead setting information is maintained without being lost. Thus, the service provided based on the overhead bytes in the SONET/SDH network can be provided over the WDM network. For example, the service provided based on the overhead bytes can be provided over a first SONET/SDH network and a second SONET/SDH network connected to the first SONET/SDH network via the WDM network.

The transmit-side OSC processing unit may set a J1 byte of path overhead in the OSC signal transmitted to the WDM network, and the receive-side OSC processing unit may output information contained in the J1 byte in the 080 signal received from the WDM network to the external to verify a conduction state over the WDM network.

The "external", which means an output destination where information, such as signals, is to be outputted, may be a display unit, a file, or another processing unit or an external device for comparing the information contained in the overhead bytes. According to this embodiment, the end-to-end conduction checking over the WDM network (i.e., conduction checking from one end of path to another) can be realized.

The receive-side OSC processing unit may output information contained in a B3 byte of path overhead in the OSC signal received from the WDM network to the external to manage the transmission quality over the WDM network. According to this embodiment, the end-to-end transmission quality can be checked over the WDM network.

The transmit-side OSC processing unit may set a user packet received externally for an F2 byte of path overhead in the OSC signal transmitted to the WDM network, and the receive-side OSC processing unit may acquire the user packet from the F2 byte of the OSC signal received from the WDM network and transmit the acquired user packet to the external.

According to this embodiment, the end-to-end transfer of user packets over the WDM network is achieved. The user packets are packets transmitted from user terminals such as PCs or IP phones and may be media access control (MAC) frames or IP packets. In other words, according to this embodiment, the OSC signal is enabled to serve as an order wire path or user channel path in MSPP. Also, according to this embodiment, a packet relay device, such as a layer 2 switch, which is otherwise required conventionally for the transmission of user packets within the transmission apparatus is no longer required.

The WDM transmitter and the WDM receiver may transmit and receive the OSC signal in an SDP frame format, respectively; to achieve clock synchronization over the WDM network, the transmission apparatus may transmit and receive a signal, containing a clock component for use in synchronization, to and from the WDM network as the OSC signal, and the transmission apparatus may extract the clock component for use in synchronization, based on the OSC signal.

The "signal containing a clock component for use in synchronization" may be a signal to which a reference frequency to be synchronized has been set, namely, to which a wavelength calculated based on the reference frequency has been set. According to this embodiment, the OSC signal transmitted and received over the WDM network can be used as a clock path in MSPP. More specifically, the arrangement may be such that, for example, the SDH transmitting unit in each of a plurality of transmission apparatuses connected over the WDM network transmits and receives the OSC signal. As a result, a master-slave synchronization can be achieved using a reference clock based on a single clock source. Hence, the number of required clock sources can be reduced and therefore the network cost can be reduced.

The transmission apparatus may further comprise: a standby-system WDM transmitter configured to transmit the optical signal to a standby-system WDM network when a failure occurring in the WDM network is detected; and a standby-system transmit-side OSC processing unit configured to set the OSC signal which is to be appended to the optical signal transmitted to the standby-system WDM network. The switching unit may include a system switching unit configured to switch a destination of the SDH frame, transmitted from the receive-side OSC processing unit, to the standby-system transmit-side OSC processing unit when the failure occurring in the WDM network is detected.

According to this embodiment, unlike the case where the receive-side OSC processing unit and the transmit-side OSC processing unit are connected using the dedicated line, the transmission path of the wavelength information is changed dynamically by the switching unit. Thus the switching of an active system to a standby system upon detection of a failure in the active system can be achieved quickly and easily.

The transmission apparatus may further comprise: a standby-system WDM receiver configured to receive the optical signal from a standby-system WDM network when a failure occurring in the WDM network is detected; and a standby-system receive-side OSC processing unit configured to process the OSC signal appended to the optical signal received from the standby-system WDM network, wherein the switching unit includes a system switching unit configured to switch a source of the SDH frame, which is to be transmitted to the transmit-side OSC processing unit, to the standby-system receive-side OSC processing unit when the failure occurring in the WDM network is detected. Similarly to the above embodiment, in this embodiment as well, the transmission path of the wavelength information is also changed dynamically by the switching unit. Thus, the switching to a standby system upon detection of a failure in the active system can be achieved quickly and easily.

Another embodiment of the present invention relates to an optical supervisory channel (OSC) processing apparatus. This apparatus processes an OSC signal transmitted and received in a WDM network and the OSC processing apparatus is installed in a transmission apparatus comprising a plurality of synchronous digital hierarchy (SDH) transmitting units for transmitting and receiving a predetermined SDR frame to and from each other and a switching unit for transferring the SDH frame transmitted from an SDH transmitting unit to another SDH transmitting unit; and an interface in the transmission apparatus complies with a synchronous digital hierarchy (SDH) frame format to enable wavelength information indicated by the OSC signal to be transmitted and received between the OSC processing apparatus and another OSC processing apparatus installed in the transmission apparatus. According to this embodiment, an OSC processing unit to realize a transmission apparatus achieving the above-described advantageous effect can be provided.

Still another embodiment of the present invention relates to a transmission controlling method. This method is performed by a transmission apparatus comprising a plurality of synchronous digital hierarchy (SDH) transmitting units for transmitting and receiving a predetermined SDH frame to and from each other and a switching unit for transferring the SDH frame transmitted from an SDH transmitting unit to another SDH transmitting unit, and the method comprises: receiving an optical signal from a wavelength division multiplexing (WDM) network; transmitting an SDH frame containing wavelength information indicated by the OSC signal, which is appended to the received optical signal, to the switching unit; receiving the SDH frame, containing the wavelength information, from the switching unit and setting an OSC signal which is to be appended to an optical signal transmitted; and transmitting the optical signal, to which the OSC signal set by said setting is appended, to the WDM network. According to this embodiment, a transmission apparatus achieving the above-described advantageous effect can be realized.

Optional combinations of the aforementioned constituting elements, and implementations of the invention in the form of methods, apparatuses, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several. Figures in which.

DETAILED DESCRIPTION OF THE INVENTION

The invention will now be described by reference to the preferred embodiments. This does not intend to limit the scope of the present invention, but to exemplify the invention.

Figure 1:
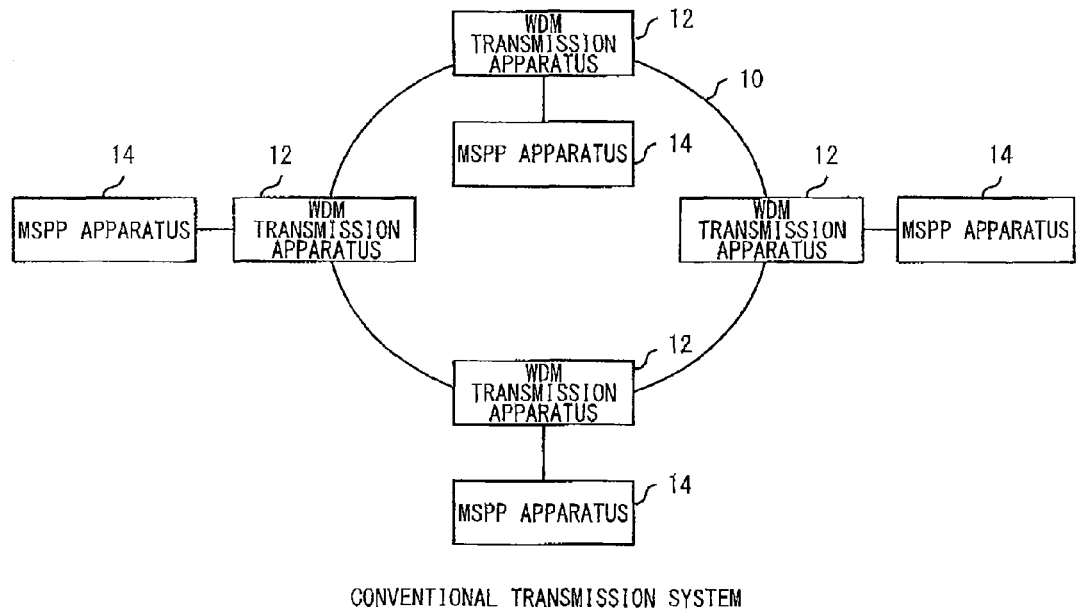
FIG. 1 illustrates the structure of a conventional transmission system.

FIG. 1 illustrates a structure of a conventional transmission system. In this conventional transmission system, a plurality of WDM (wavelength division multiplexing) transmission apparatuses are connected to a ring-structured WDM network 10 wherein an MSPP (multi-service provisioning platform) apparatus 14 is connected to each of the WDM transmission apparatuses. Typically, data sent out from a user terminal under the control of a certain MSPP 14 is transmitted all the way up to an MSPP apparatus 14, which contains a targeted user terminal, by way of the WDM transmission apparatus 12 over the WDM network 10.

In the present embodiment, no distinction is made between optical signals and electric signals unless otherwise indicated. Thus, when simply expressed as "signal", it may be either one of an optical signal and an electrical signal and it may undergo, as appropriate, an O/E (Optical-to-Electronic) conversion or E/O (Electronic-to-Optical) conversion as necessary.

Figure 2:
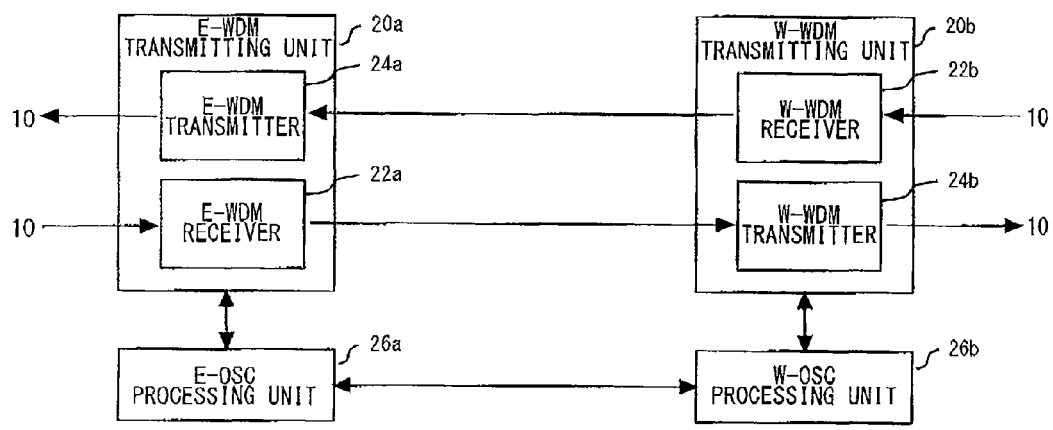
FIG. 2 is a block diagram showing a functional structure of a WDM transmission apparatus of FIG. 1.

FIG. 2 is a block diagram showing a functional structure of the WDM transmission apparatus 12 of FIG. 1. Each block shown in the block diagrams of the present patent specification may be achieved hardwarewise by elements and mechanical devices such as a CPU and the like of a computer, and softwarewise by computer programs or the like. Depicted herein are functional blocks implemented by cooperation of hardware and software. Therefore, it will be obvious to those skilled in the art that the functional blocks may be implemented by a variety of manners including hardware only, software only or a combination of both.

The WDM transmission apparatus 12 includes an E-WDM transmitting unit 20a, a W-WDM transmitting unit 20b, an E-OSC processing unit 26a, and a W-OSC processing unit 26b.

The E-WDM transmitting unit 20a transmits and receives an optical signal which has been multiplexed by WDM (this signal will be hereinafter referred to as "WDM signal" also) for one direction in the WDM network 10 (hereinafter referred to as "EAST direction" also). The E-WDM transmitting unit 20a includes an E-WDM receiver 22a and an E-WDM transmitter 24a.

The W-WDM transmitting unit 20b transmits and receives a WDM signal to and from a direction opposite to the EAST direction (hereinafter referred to as "WEST direction" also). The W-WDM transmitting unit 20b includes a W-WDM receiver 22b and a W-WDM transmitter 24b. Note that, as for the WDM signals in the present embodiment, the optical signals each having a different wavelength conform to an STM-n (synchronous transport module-n) frame format where n is a positive integer.

The optical signal of a certain wavelength in the WDM signal is an OSC (optical supervisory channel) signal used to control and monitor the optical signal or used for other purposes. This OSC signal contains information on the respective wavelengths of optical signals multiplexed in the WDM signal (hereinafter this information will be referred to simply as "wavelength information" also). Note that the OSC signal may contain information indicating a state of an amplifier (not shown in FIG. 1). Also, the optical signals of other wavelengths are optical signals indicating data bodies to be dropped to the MSPP apparatus 14 or to be transferred to another WDM transmission apparatus 12 (hereinafter referred to as "data signal" also).

Assume herein that the data signal in the present embodiment is an optical signal to be transferred to another WDM transmission apparatus 12. Thus, the E-WDM receiver 22a receives the WDM signal from the EAST direction of the WDM network 10, and transmits the data signal contained in the WDM signal to the W-WDM transmitter 24b. The W-WDM receiver 22b receives the WDM signal from the WEST direction of the WDM network 10 and transmits the data signal contained in the WDM signal to the E-WDM transmitter 24a.

As for the WDM signal received by the E-WDM receiver 22a, the E-OSC processing unit 26a transmits the wavelength information indicated by the OSC signal in the WDM signal to the W-OSC processing unit 26b. The E-OSC processing unit 26a sets the OSC signal based on the wavelength information received from the W-OSC processing unit 26b, and transmits it to the E-WDM transmitter 24a. As for the WDM signal received by the W-WDM receiver 22b, the W-OSC processing unit 26b transmits the wavelength information indicated by the OSC signal in the WDM signal to the E-OSC processing unit 26a. The W-OSC processing unit 26b sets the OSC signal based on the wavelength information received from the E-OSC processing unit 26a, and transmits it to the W-WDM transmitter 24b.

The E-OSC processing unit 26a and the W-OSC processing unit 26b are fixedly connected to each other using a back wired board (BWB). In other words, they are connected using a dedicated line which has been set beforehand in a housing of the WDM transmission apparatus 12. Thus, the hardware of the E-OSC processing unit 26a and the hardware of the W-OSC processing unit 26b need to be installed in predetermined positions of the housing of the WDM transmission apparatus 12. The wavelength information is transmitted and received between the E-OSC processing unit 26a and the W-OSC processing unit 26b through a signal having a unique format.

The E-WDM transmitter 24a transmits a WDM signal, in which a data signal received from the W-WDM receiver 22b and an OSC signal received from the E-OSC processing unit 26a are multiplexed, to the EAST direction of the WDM network 10.

The W-WDM transmitter 24b transmits a WDM signal, in which a data signal received from the E-WDM receiver 22a and an OSC signal received from the W-OSC processing unit 26b are multiplexed, to the WEST direction of the WDM network 10.

It goes without saying that various functional blocks provided with a general WDM transmission apparatus may further be included in between the E-WDM transmitting unit 20a and the W-WDM transmitting unit 20b. For example, the WDM transmission apparatus 12 may further include amplifiers which amplify a data signal received from the EAST direction, a data signal to be sent to the EAST direction, a data signal received from the WEST direction, and a data signal to be sent to the WEST direction by the use of erbium-doped optical amplifiers (EDFA), respectively.

Also, the WDM transmission apparatus 12 may further include a branching unit which branches the data signal and then retrieves individual optical signals to be transmitted to the MSPP apparatus 14 and a drop unit which transmits the respective optical signals to the MSPP apparatus 14. The WDM transmission apparatus 12 may further include an adding unit which receives optical signals sent from the MSPP apparatus 14 and a multiplexing unit which multiplexes individual optical signals containing the optical signals received from the MSPP apparatus 14 and then generates a data signal to be transmitted to the WDM network 10.

Figure 3:
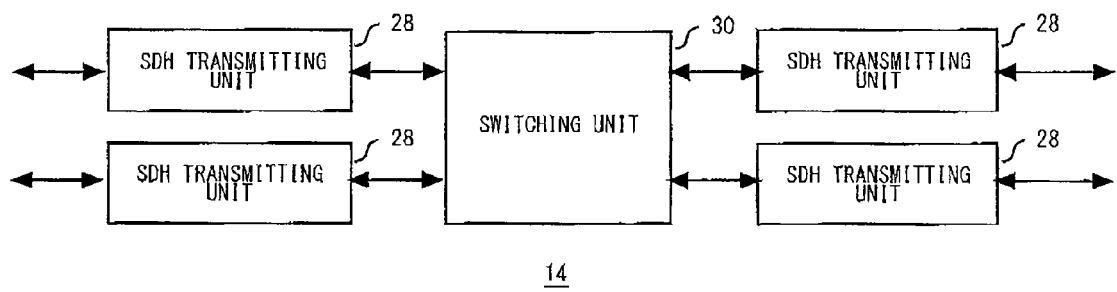
FIG. 3 is a block diagram showing a functional structure of an integrated transmission apparatus of FIG. 1.

FIG. 3 is a block diagram showing a functional structure of an integrated transmission apparatus shown in FIG. 1. The MSPP apparatus 14 includes an SDH (synchronous digital hierarchy) transmitting unit 28 and a switching unit 30.

The SDH transmitting unit 28 provides a transmission function to form a SONET/SDH (synchronous optical network/synchronous digital hierarchy) network. The SDH transmitting unit 28 has a function of interfacing with the WDM transmission apparatus 12. The SDH transmitting unit 28 acquires a data signal transmitted over the WDM network 10 from the WDM transmission apparatus 12 and transmits data to be transmitted to the WDM network 10, to the WDM transmission apparatus 12. The SDH transmitting unit 28 is connected to a not-shown external layer 2 switch or layer 3 switch and transmits and receives data via an external LAN or WAN.

The switching unit 30 has so-called a switch-fabric function and a cross-connect function. For example, the switching unit 30 receives a signal complied with an STM-n format sent from a certain SDR transmitting unit 28 and selects a transmission path for the received signal. The switching unit 30 has a switching function of transmitting the signal to another SDH transmitting unit 28 and so forth.

It is hereinbelow assumed in the present embodiment that a signal complied with the STM-1 format (hereinafter referred to as "STM-1 frame" also) is used as the signal complied with an STM-n format. As a modification to the present embodiment, it is understood by those skilled in the art that the signal complied with other STM-n formats such as STM-4, STM-16 or STM-64 format may also be used.

Figure 4:
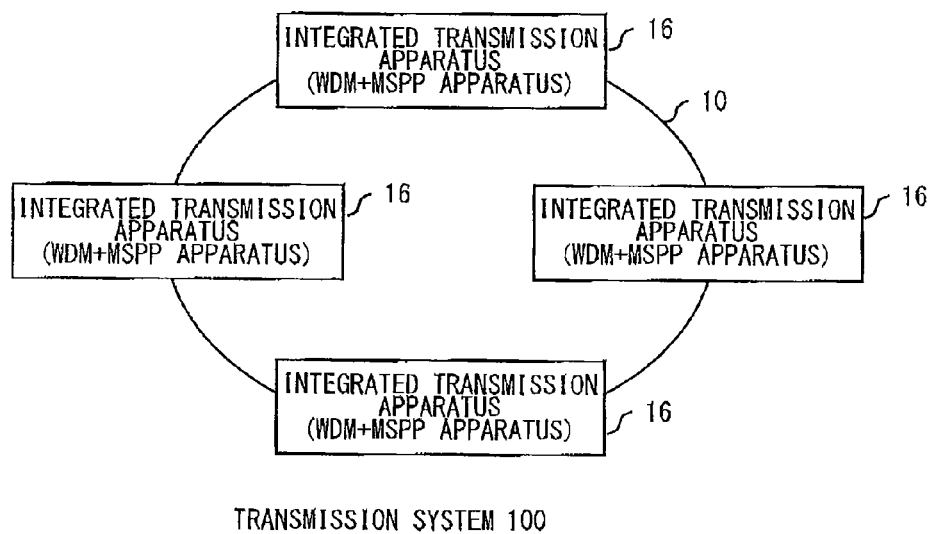
FIG. 4 shows a structure of a transmission system according to an embodiment of the present invention.

FIG. 4 shows a structure of a transmission system 100 according to an embodiment of the present invention. In the transmission system 100, a plurality of integrated transmission apparatuses 16 are connected to one another via a WDM network 10. The integrated transmission apparatus 16 is a transmission apparatus providing both the function of the WDM transmission apparatus 12 and the function of the MSPP apparatus 14 of FIG. 1 in a unified manner.

A description is now given of a problem, recognized by the inventors, to be addressed in terms of packaging when both the function of the WDM transmission apparatus 12 and the function of MSPP apparatus 14 are provided in a unified manner.

When this transmission apparatus is to be packaged, a plurality of kinds of hardwares achieving the functions of the respective functional blocks described with reference to FIG. 2 and FIG. 3 are installed in the housing of the transmission apparatus. Note that the plurality of kinds of hardwares also include hardware for executing software required to achieve the functions of the respective functional blocks. As described above, in the conventional WDM transmission apparatus 12, the E-OSC processing unit 26a and the W-OSC processing unit 26b are connected using a dedicated line and therefore their installation positions are predetermined. Thus, even though the transmission apparatus is to be initially used as an MSPP apparatus 14 only, a region in the housing (so-called "slot") within which the E-OSC processing unit 26a and the W-OSC processing unit 26b are to be installed needs to be reserved as an unused one. This adversely affects the high density packaging of the transmission apparatus, thereby causing a reduction in the cost performance.

The integrated transmission apparatus 16 according to the present embodiment is provided with a structure by which to resolve the above-described problems. That is, in the integrated transmission apparatus 16, communication interfaces of the E-OSC processing unit and the W-OSC processing unit are brought into compliance with the STM-1 frame format. As a result, the integrated transmission apparatus 16 transmits and receives wavelength information, via the switching unit 30, among the OSC processing units. The switching unit 30 has an interface used to communicate with each device installed in the integrated transmission apparatus 16. Thus, the integrated transmission apparatus 16 is no longer under the restrictions imposed on the installation positions of E-OSC processing unit and the W-OSC processing unit. In other words, the installation positions of the E-OSC processing unit and the W-OSC processing unit can be flexibly determined depending on the situation concerning slots which are unused but available in the housing of the integrated transmission apparatus 16.

By employing the above-described structure, both the OSC signals transmitted and received among the integrated transmission apparatuses 16 over the WDM network 10 and the wavelength information transmitted and received among the OSC processing units within each integrated transmission apparatus 16 are transmitted using the STM-1 frames. As a result, information contained in overhead bytes defined by STM-1, such as a section overhead and each path overhead byte value, are transmitted, without being lost, among a plurality of integrated transmission apparatuses 16 connected over the WDM network 10. Thus, the transmission system 100 can provide various types of services based on the overhead bytes provided in the SONET/SDR transmission scheme, over the WDM network 10.

Figure 5:
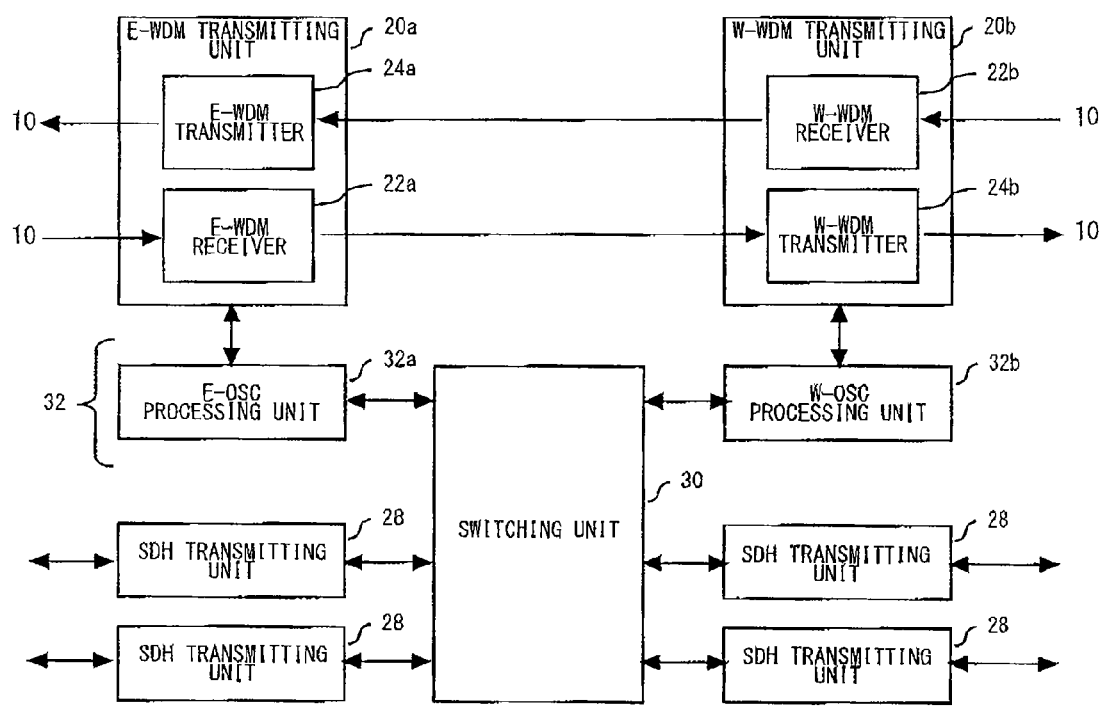
FIG. 5 is a block diagram showing a functional structure of an integrated transmission apparatus of FIG. 4.

FIG. 5 is a block diagram showing a functional structure of the integrated transmission apparatus 16 shown in FIG. 4. The integrated transmission apparatus 16 includes an E-WDM transmitting unit 20a, a W-WDM transmitting unit 20b, a plurality of SDH transmitting units 28, a switching unit 30, an E-OSC processing unit 32a and a W-OSC processing unit 32b, which are generically hereinafter referred to as "OSC processing unit 32" also. The E-OSC processing unit 32a and the W-OSC processing unit 32b transmit and receive STM-1 frames containing the wavelength information indicated by the OSC signal to and from each other via the switching unit 30.

Of the functional blocks shown in FIG. 5, those having the same functions as the WDM transmission apparatus 12 and the MSPP apparatus 14 are given the same reference numerals as those in FIG. 2 and FIG. 3. A detailed description is hereinbelow given of a structure of the OSC processing unit 32, and the repeated description on the other functional blocks in detail will be omitted.

Figure 6:
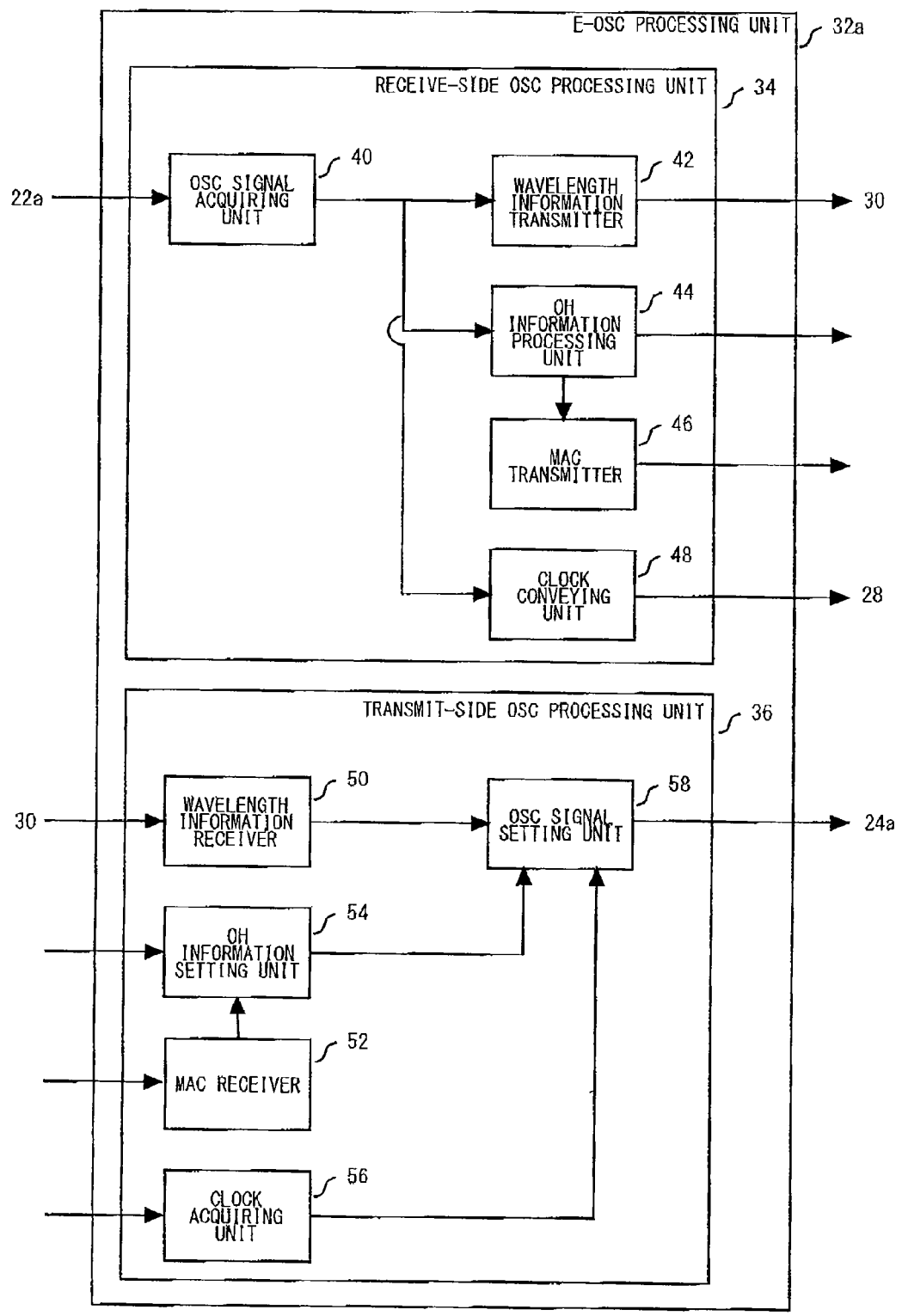
FIG. 6 is a block diagram showing a detailed structure of an OSC processing unit of FIG. 5.

FIG. 6 is a block diagram showing a detailed structure of the OSC processing unit 32a of FIG. 5. The E-OSC processing unit 32a includes a receive-side OSC processing unit 34 which processes OSC signals received by the E-WDM receiver 22a and a transmit-side OSC processing unit 36 which sets OSC signals to be transmitted to the E-WDM transmitting unit 24a.

The structural components of the W-OSC processing unit 32b shown in FIG. 5 are similar to those of the E-OSC processing unit 32a which will be described below in detail. However, a receiving device of OSC signals which are to be processed by the receive-side OSC processing unit 34 is replaced by the W-WDM processing receiver 22b. Also, a destination device of OSC signals which are to be set by the transmit-side OSC processing unit 36 is replaced by the W-WDM transmitter 24b.

The receive-side OSC processing unit 34 includes an OSC signal acquiring unit 40, a wavelength information transmitter 42, an overhead (OH) information processing unit 44, a medium access control (MAC) transmitter 46, and a clock conveying unit 48.

The OSC signal acquiring unit 40 acquires an OSC signal contained in the WDM signal received from the WDM network 10, from the E-WDM receiver 22a. The wavelength information transmitter 42 transmits an STM-1 frame containing the wavelength information indicated by the OSC signal, to the switching unit 30. In so doing, data contained in each overhead byte set in the OSC signal is set to an overhead byte corresponding to the STM-1 frame transmitted.

In order to provide various types of services offered based on the information contained in the overhead byte in the SDH transmission scheme, the OH information processing unit 44 performs a predetermined processing based on the overhead information of the OSC signal. A concrete example of such a processing will be described later. The MAC transmitter 46 transmits a MAC frame outputted from the OH information processing unit 44, to a predetermined external device. The external device meant here may be a personal computer (PC) terminal operated by a user or a layer 2 switch that constitutes a LAN.

The clock conveying unit 48 extracts a clock component from the OSC signals and conveys the extracted clock component to the SDH transmitting unit 28. For example, out of the OSC signals acquired by the OSC signal acquiring unit 40, an OSC signal of a predetermined wavelength range may be determined to be a signal used for clock synchronization, so that the clock component may be extracted based on the wavelength of said signal.

The transmit-side OSC processing unit 36 includes a wavelength information receiver 50, a MAC receiver 52, an OH information setting unit 54, a clock acquiring unit 56, and an OSC signal setting unit 58. The wavelength information receiver 50 receives, from the switching unit 30, an STM-1 frame containing the wavelength information transmitted from the wavelength information transmitter 42 of the W-OSC processing unit 32b to the switching unit 30. Then the wavelength information is conveyed to the OSC signal setting unit 58.

The MAC receiver 52 receives the MAC frame transmitted from the predetermined external device and conveys the received MAC frame to the OH information setting unit 54. The OH information setting unit 54 sets the overhead byte of an OSC signal transmitted to the E-WDM transmitter 24a. The clock acquiring unit 56 receives a clock signal from a building integrated timing supply (BITS) that outputs the reference clock, and sends the clock signal to the OSC signal setting unit 58.

The OSC signal setting unit 58 sets the OSC signal containing the wavelength information received by the wavelength information receiver 50 and having the overhead byte set by the OH information setting unit 54, and transmits said OSC signal to the E-WDM transmitter 24a. If no overhead byte has been set by its own OH information setting unit 54, the information contained in the overhead byte received, by the wavelength information receiver 50, as well as the wavelength information will be set as they are. If the clock signal has been received from the clock acquiring unit 56, a signal having a wavelength corresponding to the frequency indicated by the clock signal will be transmitted to the E-WDM transmitter 24a as the OSC signal.

An operation of the integrated transmission apparatus 16 structured as above will now be described below.

As a basic operation, a first operation example is first described wherein the WDM signal received from the EAST direction of the WDM network 10 is transferred to the WEST direction of the WDM network 10.

The E-WDM receiver 22a receives the WDM signal from the EAST direction of the WDM network 10, and transmits the data signal contained in the WDM signal so as to be sent to the W-WDM transmitter 24b. The E-OSC processing unit 32a acquires the OSC signal contained in the WDM signal, from the E-WDM receiver 22a and then transmits the STM-1 frame containing the wavelength information indicated by the OSC signal, to the switching unit 30. The W-OSC processing unit 32b acquires the STM-1 signal containing the wavelength information from the switching unit 30, and sets an OSC signal based on the acquired wavelength information. The W-WDM transmitter 24b transmits a WDM signal, in which a data signal received from the E-WDM receiver 22a and an OSC signal received from the W-OSC processing unit 32b are multiplexed, to the WEST direction of the WDM network 10.

By employing the integrated transmission apparatus 16 according to the present embodiment, the communication interfaces of the E-OSC processing unit 32a and the W-OSC processing unit 32b are complied with the frame format which can be relayed by the switching unit 30. As a result, the dedicated line is no longer needed to interconnect between the E-OSC processing unit 32a and the W-OSC processing 32b, and they are interconnected through the switching unit 30. Hence, the hardware of the OSC processing unit 32 does not need to be fixedly installed in predetermined slots of the integrated transmission apparatus 16, so that the flexible packaging of the integrated transmission apparatus 16 is assured.

Figure 7:
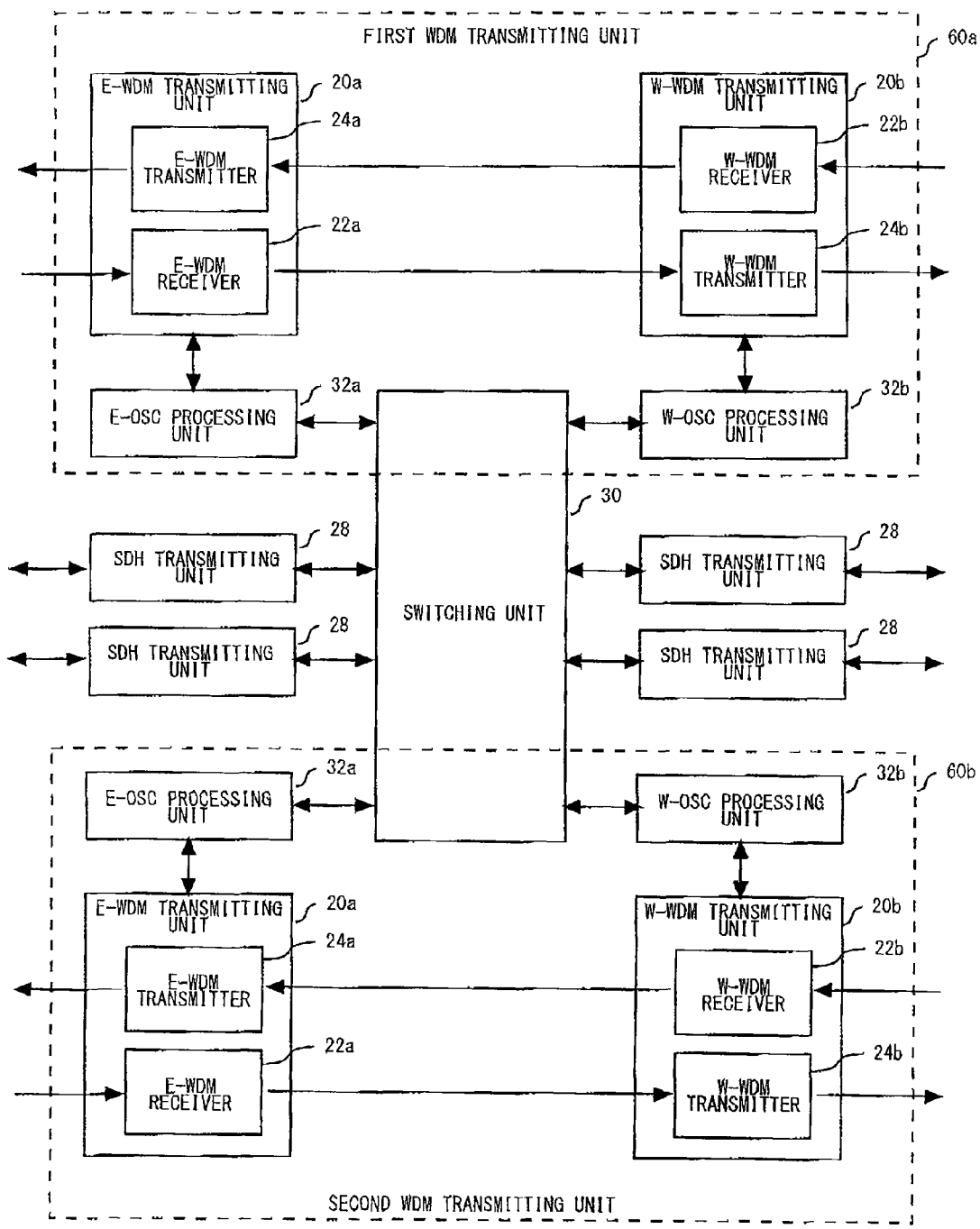
FIG. 7 is a block diagram showing an integrated transmission apparatus compatible with a newly added WDM network.

FIG. 7 is a block diagram showing an integrated transmission apparatus 16 compatible with an added WDM network. The integrated transmission apparatus 16 shown in FIG. 7 includes the existing WDM network (first WDM network), a first WDM transmitting unit 60a for transmitting WDM signals, a newly-installed second WDM network, and a second WDM transmitting unit 60b for transmitting WDM signals. Thus, even though the new WDM network has been added, new OSC processing units 32 can be easily mounted on unused slots, if any, in the housing of the existing integrated transmission apparatus 16. That is, by employing the integrated transmission apparatus 16 structured as above, any change of a situation in the network can be flexibly coped with.

A description is next given of a second operation example wherein OSC signals are used for path tracing and an end-to-end conduction checking over a WDM network 10 is achieved.

Figure 8:
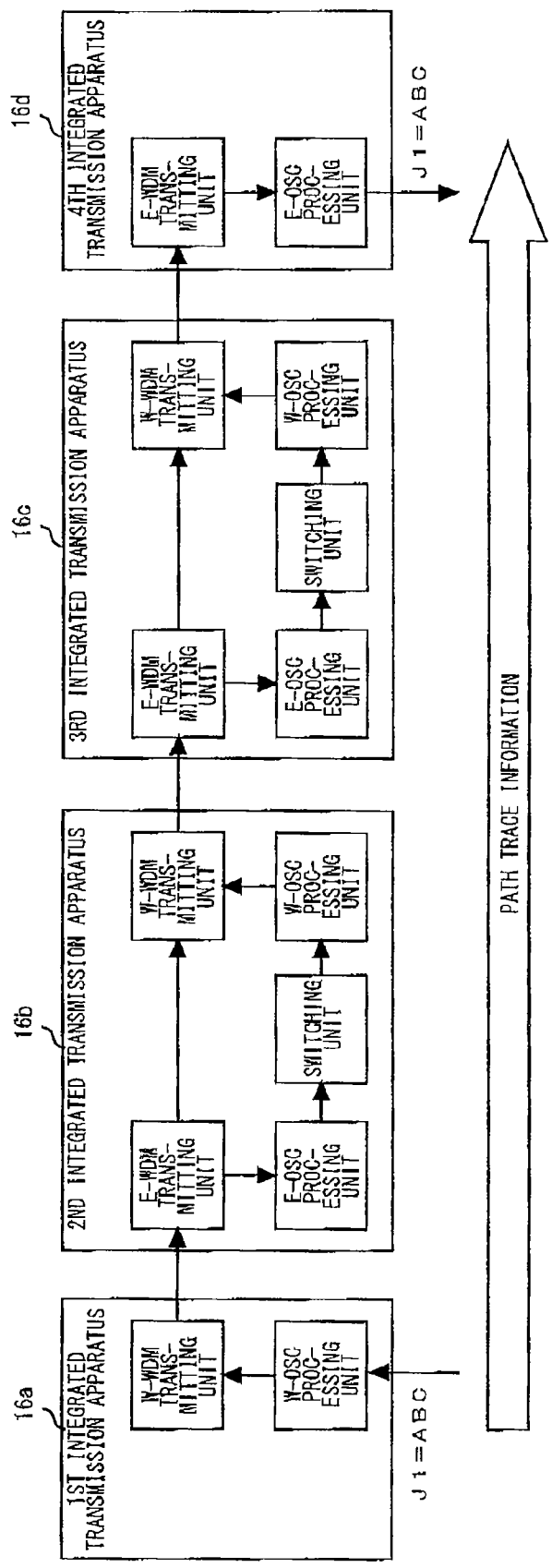
FIG. 8 is a schematic illustration of a second operation example.

FIG. 8 is a schematic illustration of the second operation example. FIG. 8 shows a transmission system in which a first integrated transmission apparatus 16a, a second integrated transmission apparatus 16b, a third integrated transmission apparatus 16c and a fourth integrated transmission apparatus 16d are connected via the WDM network 10. In this transmission system, OSC signals are transmitted from the first integrated transmission apparatus 16a all the way up to the fourth integrated transmission apparatus 16d.

As shown in FIG. 8, in the first integrated transmission apparatus 16a, the OH information setting unit 54 of the W-OSC processing unit 32b sets verification data received from the external device such as a user terminal, to a J1 byte of path overhead in the OSC signal. The W-WDM transmitter 24b of the W-WDM transmitting unit 20b transmits the WDM signal, which contains the OSC signal to which the J1 byte has been set, to the WDM network 10.

From then onward, the OSC signal is transmitted and received in the STM-1 frame format between the first integrated transmission apparatus 16a and the second integrated transmission apparatus 16b, between the second integrated transmission apparatus 16b and the third integrated transmission apparatus 16c and between the third integrated transmission apparatus 16c and the fourth integrated transmission apparatus 16d. Within the second integrated transmission apparatus 16b and within the third integrated transmission apparatus 16c, too, the information contained in the OSC signal is transferred in the STM-1 frame. Thus, if the communication status of the WDM network 10 is normal, the J1 byte of path overhead will not be removed and will be transmitted all the way up to the fourth integrated transmission apparatus 16d.

In the fourth integrated apparatus 16d, the OH information processing unit 44 of the E-OSC processing unit 32a detects the J1 byte of the OSC signal acquired by the OSC signal acquiring unit 40 and conveys the setting information set in said J1 byte to the external. For example, the verification information set by the first integrated transmission apparatus 16a is stored and then the setting information conveyed from the OH information processing unit 44 is compared against said verification information. If the setting information does not match the verification information, the setting information may be conveyed to a conduction checking unit that sends an alert to a predetermined device. As another example, the setting information of the J1 byte may be outputted to an output medium such as a display unit in order that the setting information can be compared against the verification information of the J1 byte.

According to the second operation example, in a path set across the WDM network 10, data contained in J1 byte at the both ends of the path are compared with each other, so that the conduction checking can be done by detecting whether the data thereon at the both ends thereof coincide with or differ from each other. Typically, it can be determined that normal communications are underway if the data thereon at the both ends thereof coincide with each other, whereas it can be determined that there is an abnormality in the communications if the data thereon at the both ends thereof differ from each other. Thus, the present embodiment is particularly effective and useful in situations where the setting of data signals are difficult, for example, in a situation where the transmission system 100 is under construction.

Figure 9:
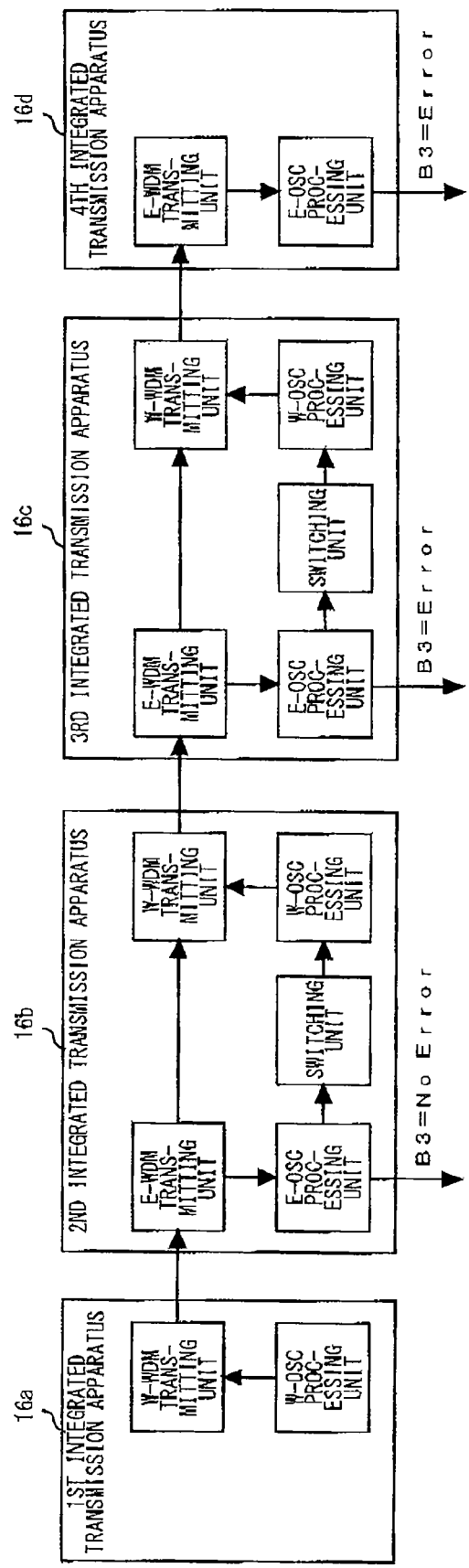
FIG. 9 is a schematic illustration of a third operation example.

A description is now given of a third operation example where the transmission quality is managed by monitoring a B3 byte of path overhead contained in the OSC signal. FIG. 9 is a schematic illustration of the third operation example. In FIG. 9 as well, the OSC signal is transmitted from the first integrated transmission apparatus 16a all the way up to the fourth integrated transmission apparatus 16d.

As shown in FIG. 9, the OH information processing unit 44 of the E-OSC processing unit 32a detects the B3 byte in the OSC signal acquired by the OSC signal acquiring unit 40, in each of the second integrated transmission apparatus 16b, the third integrated transmission apparatus 16c and the fourth integrated transmission apparatus 16d. The data contained in B3 byte is conveyed to the external. For example, information concerning the transmission quality indicated by the B3 byte may be outputted to an output medium such as a file or a display unit so that the user can verify the transmission quality. Also, the data contained in B3 byte may be conveyed to a transmission-quality determining unit that sends an alert to a predetermined device if the transmission quality indicated by the B3 byte is a reference value or below.

According to the third operation example, the quality of end-to-end transmission can be managed based on the data contained in B3 byte in the terminal point of path set across the WDM network 10. In FIG. 9, the B3 byte in the fourth integrated transmission apparatus 16d indicates "Error" and therefore it can be determined that the transmission quality is degraded. The data contained in B3 byte is outputted also in an integrated transmission apparatus that relays the OSC signal. That is, since the B3 byte becomes "Error" in the third integrated transmission apparatus 16c and the integrated transmission apparatuses subsequent thereto (i.e., the fourth integrated transmission apparatus 16d in FIG. 9), it can be determined that the transmission quality is degraded between the second integrated transmission apparatus 16b and the third integrated transmission apparatus 16c.

As another modification of the present embodiment, B1 byte and B2 byte in the section overhead may also be monitored as a whole, and data contained in B1 byte and B2 byte in addition to the data contained in B3 may also be outputted to the external. In this manner, the combined data contained in B1 byte, B2 byte and B3 byte can serve as a criterion for determining the transmission quality and therefore the transmission quality in each section set within a path can be identified. As a result, a site where the transmission quality deteriorates can be identified in detail.

Figure 10:
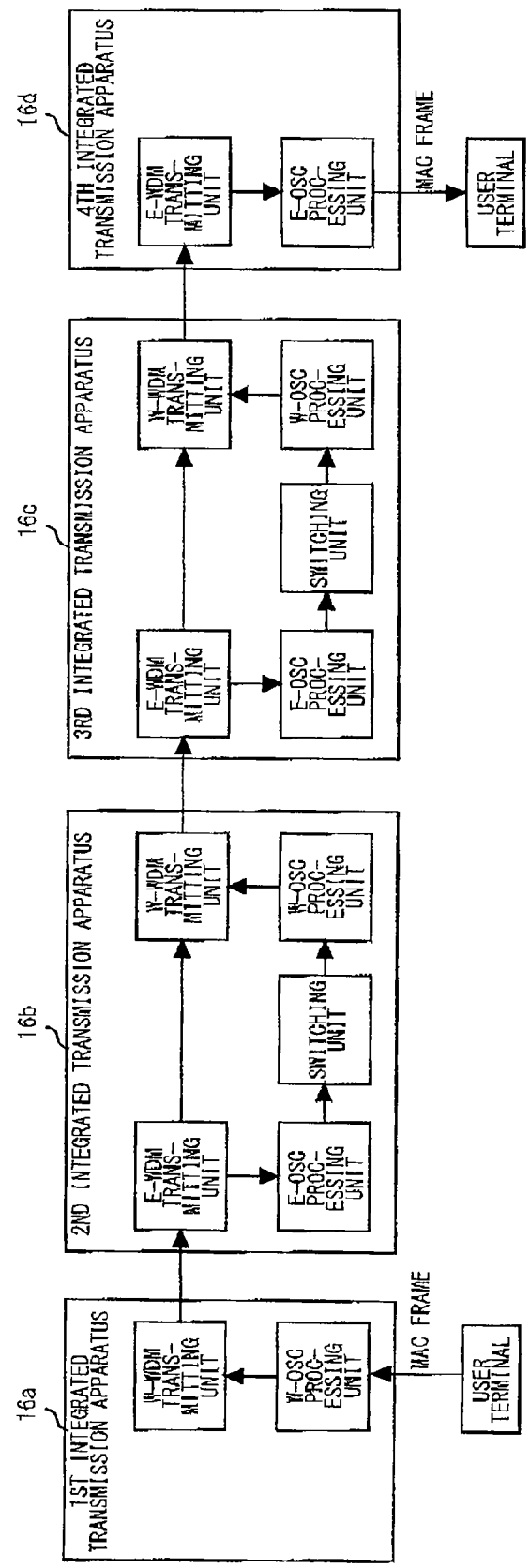
FIG. 10 is a schematic illustration of a fourth operation example.

A description is now given of a fourth operation example where the OSC signal is used as a packet transporting means, that is, used as an order wire path or user channel path. FIG. 10 is a schematic illustration of the fourth operation example. In FIG. 10 as well, the OSC signal is transmitted from the first integrated transmission apparatus 16a all the way up to the fourth integrated transmission apparatus 16d.

As shown in FIG. 10, in the first integrated transmission apparatus 16a, the MAC receiver 52 of the W-OSC processing unit 32b receives a MAC frame transmitted from the user terminal. Then the OH information setting unit 54 sets the MAC frame in an F2 byte of path overhead in the OSC signal. The W-WDM transmitter 24b of the W-WDM transmitting unit 20b transmits a WDM signal, which contains the OSC signal to which the F2 byte has been set, to the WDM network 10.

As described above, the OSC signal is transmitted and received in the STM-1 frame format between the first integrated transmission apparatus 16a and the second integrated transmission apparatus 16b, between the second integrated transmission apparatus 16b and the third integrated transmission apparatus 16c and between the third integrated transmission apparatus 16c and the fourth integrated transmission apparatus 16d. Within the second integrated transmission apparatus 16b and within the third integrated transmission apparatus 16c, too, the information contained in the OSC signal is transferred in the STM-1 frame. Thus the F2 byte of path overhead is transmitted, without being removed, all the way up to the fourth integrated transmission apparatus 16d.

In the fourth integrated transmission apparatus 16d, the OH information processing unit 44 of the Z-OSC processing unit 32a detects the F2 byte of the OSC signal acquired by the OSC signal acquiring unit 40. Then the MAC transmitter 46 transmits the MAC frame to the user terminal.

Figure 11:
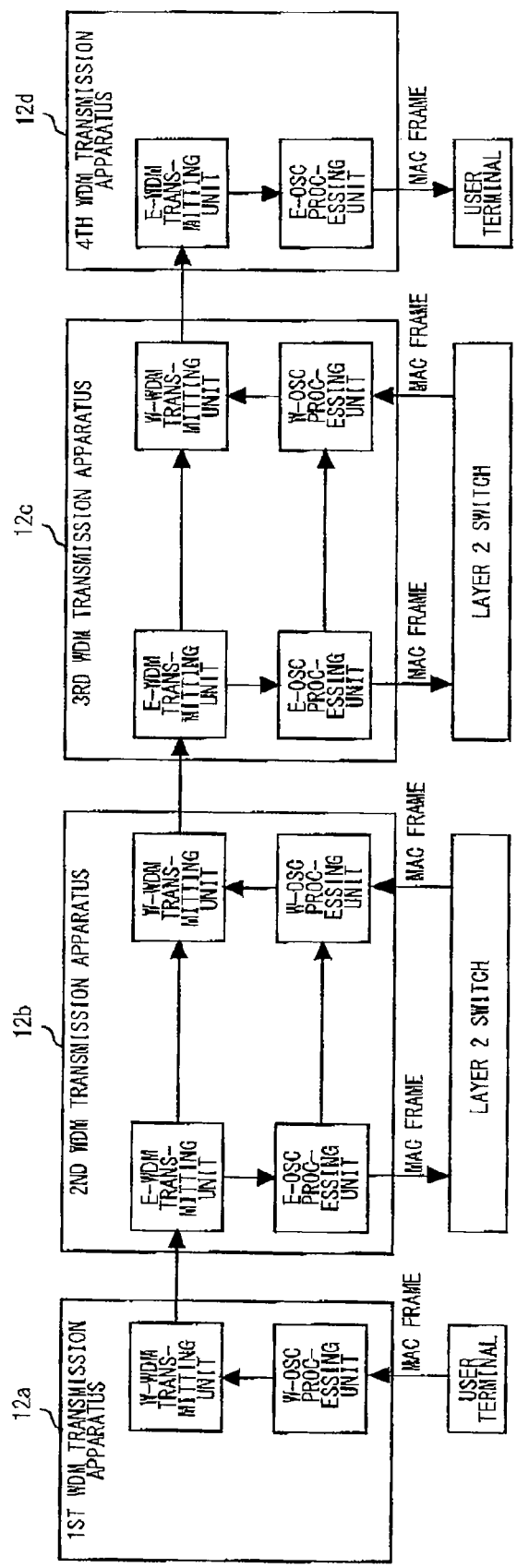
FIG. 11 is a schematic illustration showing a conventional structure to realize a fourth operation example.

FIG. 11 is a schematic illustration showing a conventional structure to realize a fourth operation example. Referring to FIG. 11, the OSC signal is transmitted from a first WDM transmission apparatus 12a all the way up to a fourth WDM transmission apparatus 12d. In the conventional WDM transmission apparatuses 12, the wavelength information is conveyed from an E-OSC processing unit 26a to a W-OSC processing unit 26b using data of unique format, and the information contained in the F2 byte cannot be conveyed. Accordingly, provision of two layer 2 switches is required to convey the MAC frame, set to the F2 byte, from E-OSC processing unit 26a to the W-OSC processing unit 26b. In this case, the two layer 2 switches are provided external to the second WDM transmission apparatus 12b and the third WDM transmission apparatus 12c, respectively. This increases a system cost.

By employing the integrated transmission apparatus 16 according to the present embodiment, the MAC frames set to the F2 byte can be seamlessly transmitted in an end-to-end manner. The external switching devices required in the conventional architecture is no longer required, thereby reducing the system cost.

Figure 12:
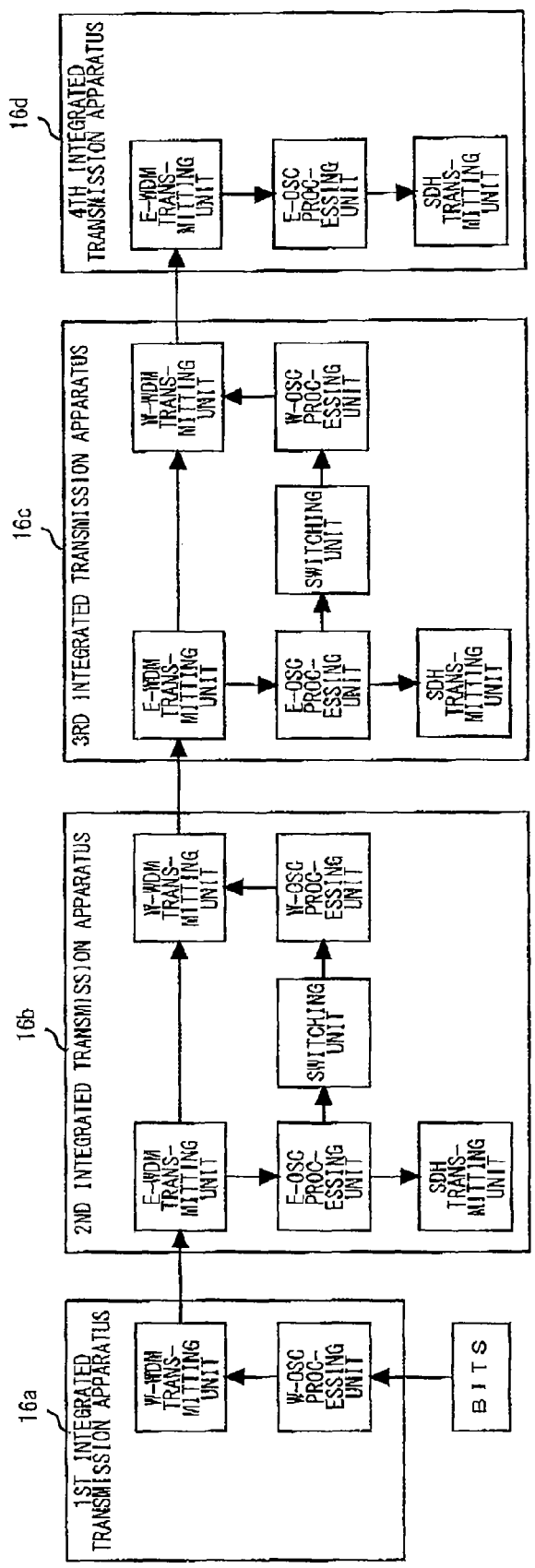
FIG. 12 is a schematic illustration of a fifth operation example.

A description is now given of a fifth operation example where the OSC signal is used as a clock signal for use in clock synchronization. FIG. 12 is a schematic illustration of the fifth operation example. In FIG. 12 as well, the OSC signal is transmitted from the first integrated transmission apparatus 16a all the way up to the fourth integrated transmission apparatus 16d.

As shown in FIG. 12, in the first integrated transmission apparatus 16a, the clock acquiring unit 56 of the W-OSC processing unit 32b receives a clock signal from an external BITS (building integrated timing supply). The OSC signal setting unit 58 sets an OSC signal having a wavelength calculated in association with the clock signal. Then the W-WDM transmitter 24b of the W-WDM transmitting unit 20b transmits a WDM signal, containing said OSC signal, to the WDM network 10. Note that the SDH transmitting unit 28 of the first integrated transmission apparatus 16a may receive the clock signal from the BITS and synchronize clocks.

In the second integrated transmission apparatus 16b, the third integrated transmission apparatus 16c and the fourth integrated transmission apparatus 16d, the OSC signal acquiring unit 40 of the E-OSC processing unit 32a identifies an OSC signal of a predetermined wavelength as a clock signal and conveys the thus identified clock signal to the clock conveying unit 48. The clock conveying unit 48 sets a clock signal based on the OSC signal received as the clock signal, and transmits the clock signal to the SDH transmitting unit 28. The SDH transmitting unit 28 synchronizes clocks according to the clock signal sent from the clock conveying unit 28. As a result, the clock synchronization of the first integrated transmission apparatus 16a through the fourth integrated transmission apparatus 16d over the WDM network 10 is achieved. In other words, the SDH transmitting units 28 of the entire transmission system 100 can be synchronized with a reference clock outputted from a single clock source.

Shown in the above-described fifth operation example is the clock synchronization processing where a BITS connected to the first integrated transmission apparatus 16a serves as the clock source. As still another modification, a plurality of BITS's may be provided in the transmission system 100, and the clock signal supplied from each BITS may propagate through the transmission system 100 as the OSC signal. In such a case, an index value indicating the quality of clock signal may be set in an S1 byte of section overhead in the OSC signal that propagates the clock signal supplied from each BITS. And a clock signal used for the clock synchronization may be selected based on data contained in the S1 byte of each OSC signal.

For example, the OH information setting unit 54 of the integrated transmission apparatus 16 connected to each BITS may set the S1 byte according to the clock signal supplied from each BITS. Then the clock conveying unit 48 in each integrated transmission apparatus 16 may refer to the S1 byte of each of a plurality of OSC signals indicating the clock signals, identify a clock signal having the highest quality, and convey the thus identified clock signal to the SDH transmitting unit 28. In other words, when a clock path used for the clock synchronization is to be selected from among a plurality of clock paths set across the WDM network 10, the priority may be given to a clock path whose quality indicated by the S1 byte is higher and such a clock path may be selected. Also the clock path to be selected may be changed as needed according to the variation in the quality indicated by the S1 byte.

The present invention has been described based on the exemplary embodiments. The exemplary embodiments are intended to be illustrative only, and it is understood by those skilled in the art that various modifications to constituting elements and processes could be developed and that such modifications are also within the scope of the present invention.

As still another modification, the transmission apparatus 16 may include an active-system transmitting unit 62a for transferring and receiving the WDM signals between active-system WDM networks and a standby-system WDM transmitting unit for transmitting and receiving the WDM signals between standby-system WDM networks. The active-system transmitting unit 62a keeps operating while the communication status of the active WDM networks 10 is normal. Also, the switching unit 30 may monitor the communication status of the WDM network 10, and the source or destination of the STM-1 frame may be switched, from the active-system transmitting unit 62a to the standby-system transmitting unit 62b, according to the monitored communication status.

Figure 13:
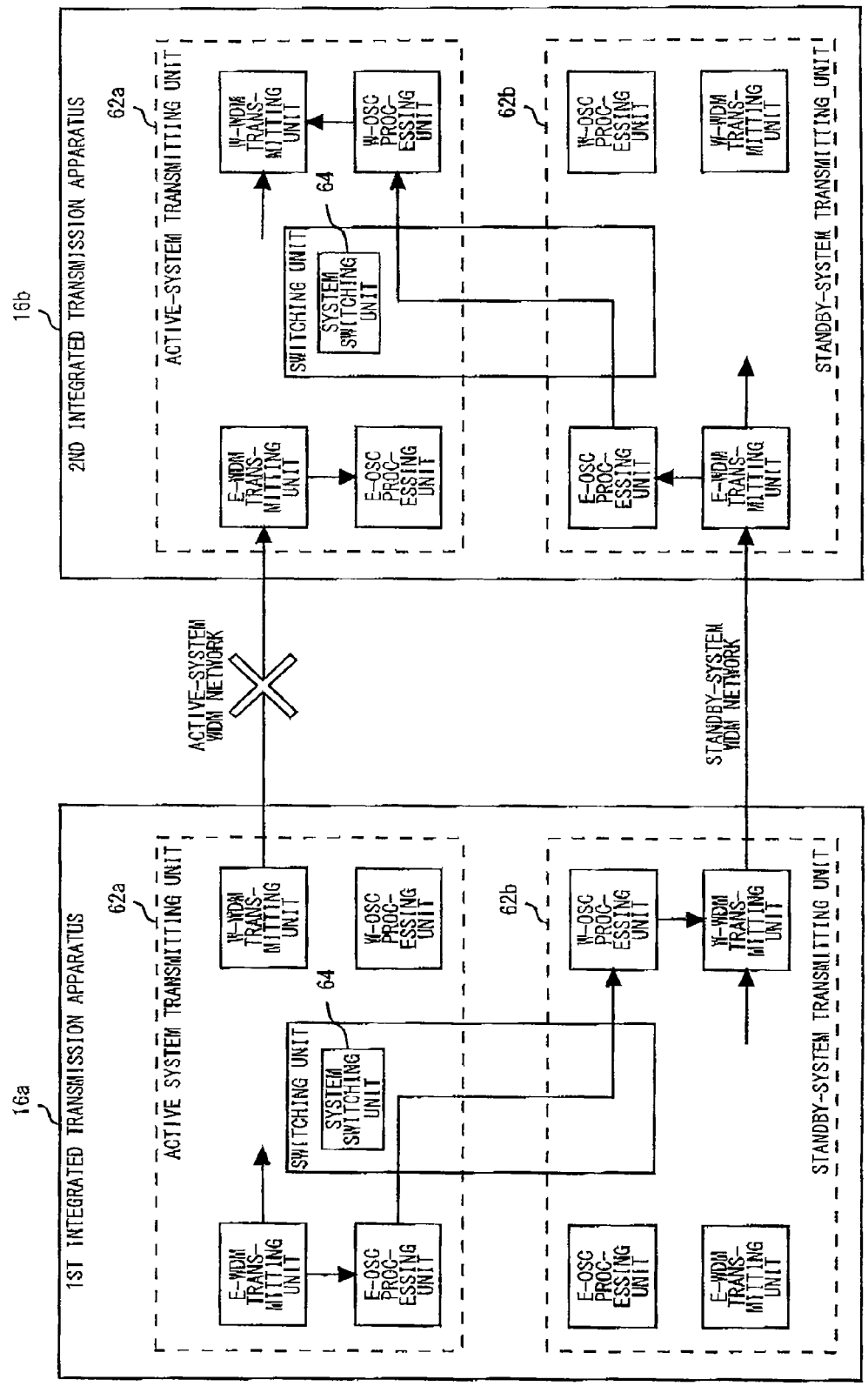
FIG. 13 is a schematic illustration of a system switching processing in a modification.

FIG. 13 is a schematic illustration of a system switching processing in a modification. FIG. 13 illustrates a state where a communication in the active system networks has failed during the communication between the active-system transmitting unit 62a in the first integrated transmission apparatus 16a and the active-system transmitting unit 62a in the second integrated transmission apparatus 16b via the active-system WDM network.

At this time, in the first integrated transmission apparatus 16a, a system switching unit 64 of the switching unit 30 detects a communication failure status in the active-system WDM network. Then the destination of the STM-1 frame transmitted from the E-OSC processing unit 32a of the active-system transmitting unit 62a is switched from the W-OSC processing unit 32b of the active-system transmitting unit 62a to the W-OSC processing unit 32b of the standby-system transmitting unit 62b. As a result, the WDM signal is transmitted from the W-WDM transmitting unit 20b of the standby-system transmitting unit 62b to the standby-system WDM network. Also, a data signal transmitted from the E-WDM transmitting unit 20a of the active-system transmitting unit 62 is switched as appropriate so that the data signal can be received by the W-WDM transmitting unit 20b of the standby-system transmitting unit 62b.

Also, in the second integrated transmission apparatus 16b, a system switching unit 64 of the switching unit 30 detects a communication failure status in the active-system WDM network. Then the source of the STM-1 frame to be transmitted to the W-OSC processing unit 32b of the active-system transmitting unit 62a is switched from the E-OSC processing unit 32a of the active-system transmitting unit 62a to the E-OSC processing unit 32a of the standby-system transmitting unit 62b. As a result, the WDM signal transmitted to the standby-system WDM network will be received by the E-OSC processing unit 32a of the standby-system transmitting unit 62b.

According to the present modification, the transmission path of the OSC signals and the wavelength information is switched appropriately, using a path switching function of the switching unit 30, depending on the communication status of the WDM networks. Hence, even when the communication failure occurs in an active-system WDM network, a fail-over system in which the standby-system WDM networks are used as backup lines is achieved easily and instantly.

It should be understood by those skilled in the art that the functions to be performed by the constituent features cited in the claims can also be realized by the components shown in the embodiments and modifications thereof alone or in combination.

What is claimed is:

1. A transmission apparatus comprising:
   a plurality of synchronous digital hierarchy (SDH) transmitting units configured to transmit and receive a predetermined SDH frame to and from each other;
   a switching unit configured to transfer the SDH frame transmitted from an SDH transmitting unit to another SDH transmitting unit;
   a WDM receiver configured to receive an optical signal from a wavelength division multiplexing (WDM) network;
   a receive-side optical supervisory channel (OSC) processing unit configured to process an OSC signal appended to the received optical signal;
   a WDM transmitter configured to transmit the optical signal to the WDM network; and
   a transmit-side OSC processing unit configured to set an OSC signal which is to be appended to an optical signal to be transmitted,
   wherein the receive-side OSC processing unit transmits the SDH frame containing wavelength information indicated by the OSC signal, to the switching unit, and
   wherein the transmit-side OSC processing unit receives the SDH frame containing wavelength information, from the switching unit and sets the OSC signal based on the wavelength information.

2. A transmission apparatus according to claim 1, wherein the WDM transmitter and the WDM receiver transmit and receive the OSC signal in an SDH frame format, respectively, and
   wherein the transmission apparatus provides a service provided in an SDH transmission scheme over the WDM network, based on an overhead byte set in the OSC signal received from the WDM network.

3. A transmission apparatus according to claim 2, wherein the transmit-side OSC processing unit sets a J1 byte of path overhead in the OSC signal transmitted to the WDM network, and
   wherein the receive-side OSC processing unit outputs information contained in the J1 byte in the OSC signal received from the WDM network to the external to verify a conduction state over the WDM network.

4. A transmission apparatus according to claim 2, wherein the receive-side OSC processing unit outputs information contained in a B3 byte of path overhead in the OSC signal received from the WDM network to the external to manage the transmission quality over the WDM network.

5. A transmission apparatus according to claim 2, wherein the transmit-side OSC processing unit sets a user packet received externally for an F2 byte of path overhead in the OSC signal transmitted to the WDM network, and
   wherein the receive-side OSC processing unit acquires the user packet from the F2 byte in the OSC signal received from the WDM network and transmits the acquired user packet to the external.

6. A transmission apparatus according to claim 1, wherein the WDM transmitter and the WDM receiver transmit and receive the OSC signal in an SDH frame format, respectively, and
   wherein, to achieve clock synchronization over the WDM network, the transmission apparatus transmits and receives a signal, containing a clock component for use in synchronization, to and from the WDM network as the OSC signal, and
   the transmission apparatus extracts the clock component for use in synchronization, based on the OSC signal.

7. A transmission apparatus according to claim 1, further comprising:
   a standby-system WDM transmitter configured to transmit the optical signal to a standby-system WDM network when a failure occurring in the WDM network is detected; and
   a standby-system transmit-side OSC processing unit configured to set the OSC signal which is to be appended to the optical signal transmitted to the standby-system WDM network,
   wherein the switching unit includes a system switching unit configured to switch a destination of the SDH frame, transmitted from the receive-side OSC processing unit, to the standby-system transmit-side OSC processing unit when the failure occurring in the WDM network is detected.

8. A transmission apparatus according to claim 1, further comprising:
   a standby-system WDM receiver configured to receive the optical signal from a standby-system WDM network when a failure occurring in the WDM network is detected; and a standby-system receive-side OSC processing unit configured to process the OSC signal appended to the optical signal received from the standby-system WDM network, wherein the switching unit includes a system switching unit configured to switch a source of the SDH frame, which is to be transmitted to the transmit-side OSC processing unit, to the standby-system receive-side OSC processing unit when the failure occurring in the WDM network is detected.

9. An optical supervisory channel (OSC) processing apparatus for processing an OSC signal transmitted and received in a WDM network, wherein the OSC processing apparatus is installed in a transmission apparatus comprising a plurality of synchronous digital hierarchy (SDH) transmitting units for transmitting and receiving a predetermined SDH frame to and from each other and a switching unit for transferring the SDH frame transmitted from an SDH transmitting unit to another SDH transmitting unit, and wherein an interface in the transmission apparatus complies with a synchronous digital hierarchy (SDH) frame format to enable wavelength information indicated by the OSC signal to be transmitted and received between the OSC processing apparatus and another OSC processing apparatus installed in the transmission apparatus.

10. A transmission controlling method performed by a transmission apparatus comprising a plurality of synchronous digital hierarchy (SDH) transmitting units for transmitting and receiving a predetermined SDH frame to and from each other and a switching unit for transferring the SDH frame transmitted from an SDH transmitting unit to another SDH transmitting unit, the method comprising:

receiving an optical signal from a wavelength division multiplexing (WDM) network;

transmitting an SDH frame containing wavelength information indicated by the OSC signal, which is appended to the received optical signal, to the switching unit;

receiving the SDH frame, containing the wavelength information, from the switching unit and setting an OSC signal which is to be appended to an optical signal to be transmitted; and transmitting the optical signal, to which the OSC signal set by said setting is appended, to the WDM network.

* * * * *